United States Patent [19]

Asada et al.

[11] Patent Number: 5,430,499
[45] Date of Patent: Jul. 4, 1995

[54] APPARATUS FOR CORRECTING VERTICAL APERTURE OF AN IMAGE

[75] Inventors: Kouji Asada; Hiroyasu Ohtsubo, both of Yokohama; Masaru Noda, Kanagawa, all of Japan

[73] Assignee: Hitachi, Ltd., Tokyo, Japan

[21] Appl. No.: 118,647

[22] Filed: Sep. 10, 1993

[51] Int. Cl.$^6$ .............................................. H04N 5/208
[52] U.S. Cl. .................................. 348/628; 348/252; 348/625
[58] Field of Search ............... 348/252, 628, 629, 625; 358/162; H04N 5/208

[56] References Cited

U.S. PATENT DOCUMENTS

| | | | |
|---|---|---|---|
| 3,804,980 | 4/1974 | Lowry | 348/628 |
| 4,698,673 | 10/1987 | Johnson | 348/628 |
| 5,057,923 | 10/1991 | Matsuda | 348/252 |
| 5,144,399 | 9/1992 | Nakayama et al. | 348/629 |
| 5,268,758 | 12/1993 | Nakayama et al. | 348/628 |

FOREIGN PATENT DOCUMENTS

| | | | |
|---|---|---|---|
| 38074 | 3/1983 | Japan | 358/162 |
| 102064 | 6/1985 | Japan | 358/162 |
| 202071 | 8/1989 | Japan | H04N 5/208 |
| 264475 | 10/1989 | Japan | H04N 5/208 |
| 154375 | 5/1992 | Japan | H04N 5/208 |
| 299671 | 10/1992 | Japan | H04N 5/208 |

Primary Examiner—Victor R. Kostak
Assistant Examiner—Chris Grant
Attorney, Agent, or Firm—Antonelli, Terry, Stout & Kraus

[57] ABSTRACT

An apparatus for correcting a vertical aperture of an image generates a vertical aperture correction signal having no line pair component contained therein from a signal read out at every frame from an imaging apparatus using an imaging device of pixel mixing system, the circuit arrangement for realizing the vertical aperture correcting apparatus being such that an original signal, a 2H (H is a horizontal scanning period) delay signal and a 4H delay signal are generated from the imaging device and a sum of the original signal and the 4H delay signal is subtracted from the 2H delay signal to thereby generate a vertical aperture correction signal and also the circuit arrangement being such that luminance signal spectral characteristics are approximated at every horizontal scanning by adjusting a gain of a signal read out from the imaging device.

26 Claims, 8 Drawing Sheets

FIG. 2
PRIOR ART
| Mg | G | Mg | G | Mg | G | Mg |
|----|----|----|----|----|----|----|
| Ye | Cy | Ye | Cy | Ye | Cy | Ye |
| G | Mg | G | Mg | G | Mg | G |
| Ye | Cy | Ye | Cy | Ye | Cy | Ye |
| Mg | G | Mg | G | Mg | G | Mg |
FIG. 3
PRIOR ART
S(n)
S(n-1)
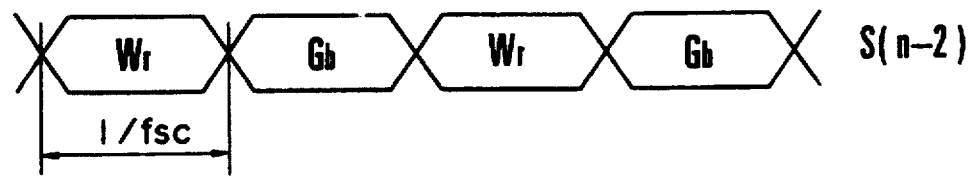
S(n-2)

S(n)

S(n-1)

S(n-2)

APPARATUS FOR CORRECTING VERTICAL APERTURE OF AN IMAGE

BACKGROUND OF THE INVENTION

The present invention relates to an apparatus for correcting a vertical aperture of an image for use in improving a sharpness of an image.

Electronic still cameras that can record color photographs according to a magnetic recording system instead of a metal halide photograph have the following specific features:

(1) Conventional techniques, such as a VTR (video tape recorder), a floppy disk or the like can be applied to the electronic still camera; and (2) Electronic still cameras can record an image on an inexpensive magnetic recording medium.

Therefore, electronic still cameras are expected as one of promising future media. The Journal of the Institute of Television Engineers of Japan (Vol. 39, No. 9 (1985), pp. 760 to 764) describes all details of the electronic still camera.

As an imaging device utilized to realize an electronic still camera, it is to be desired that an imaging device of a so-called pixel mixing system that is generally utilized in the existing video cameras is used because the imaging device of the pixel mixing system can be utilized for general purpose and conventional video camera techniques can be applied to the imaging device of the pixel mixing system.

A CCD (charge-coupled device) imaging device of a pixel mixing system mixes and reads out adjacent two pixels of upper and lower lines within the imaging device in order to reduce a blur produced on an image by the motion of an object.

FIG. 2 of the accompanying drawings shows a typical example of a filter array of the conventional CCD imaging device of the pixel mixing system. As shown in FIG. 2, in the first field, pixels of adjacent upper and lower two lines are read out at every horizontal scanning as A1, A2, A1, A2, . . . , and pixel signals of upper and lower lines are added and then output at every pixel. Similarly, in the next field, pixels of upper and lower two lines are added and then read out at every horizontal scanning as B1, B2, B1, B2, . . . As a result, the CCD imaging device of the pixel mixing system alternately outputs (Mg+Ye) and (G+Cy) or (G+Ye) and (Mg+Cy) at every horizontal scanning. Assuming now that Wr=Mg+Ye, Gb=G+Cy, Gr=G+Ye and Wb=Mg+Cy, then a signal output from the imaging device is expressed as shown in FIG. 3 where S(n) represents an original signal, S(n−1) represents a signal delayed by 1H (H is a horizontal scanning period) and S(n−2) represents a signal delayed by 2H.

An aperture correcting circuit is adapted to correct a spatial frequency deteriorated by some optical elements, such as a lens and a quartz filter. As the aperture correcting circuit, there are known a horizontal aperture correcting circuit that can improve a sharpness of an image in the horizontal direction and a vertical aperture correcting circuit that can improve a sharpness of an image in the vertical direction.

FIG. 4 shows a vertical aperture correcting circuit as an example of a vertical aperture correcting circuit utilized in a conventional color video camera. This vertical aperture correcting circuit is described in ["Image Electronic Circuit" in "Image Electronics Course" edited by the Institute of Television Engineers of Japan, pp. 97-100] published by Corona Publishing Co.

In FIG. 4, reference numeral 13 depicts an imaging device, 14, 15 1H delay circuits, 16, 18, 23 adding circuits, 19 a subtracting circuit, 17, 21 coefficient circuits, 20 an LPF (low-pass filter), 9 a horizontal aperture correction signal generating circuit and 10 a low band luminance signal generating circuit, respectively.

As shown in FIG. 4, the video signal that was earlier described with reference to FIGS. 2 and 3 is output from the imaging device 13. The output video signal is delayed by 1H (i.e., one horizontal scanning period) by the 1H delay circuit 14 and further delayed by 1H by the 1H delay circuit 15 so that the 1H delay circuit 15 outputs a video signal delayed by 2H (i.e., two horizontal scanning periods).

The adding circuit 16 adds the original signal from the imaging device 13 and the 2H delay signal from the 1H delay circuit 15. The added signal from the adding circuit 16 is multiplied with a coefficient of ½ by the coefficient circuit 17 and then supplied to the adding circuit 18 and the subtracting circuit 19.

The subtracting circuit 19 subtracts the output of the coefficient circuit 17 from the 1H delay signal from the 1H delay circuit 14. Consequently, the subtracted output from the subtracting circuit 19 becomes a signal that has a positive or negative peak at the portion where an image is changed in the vertical direction, i.e., a signal indicative of a vertical aperture (contour) portion. The output from the subtracting circuit 19 is eliminated in frequency component of the horizontal direction by the low-pass filter (LPF) 20 and multiplied with a gain coefficient K by the coefficient circuit 21, thereby being adjusted in gain. Thus, a vertical aperture correction signal YV is generated from the coefficient circuit 21.

The vertical aperture correction signal YV is expressed by the following equation (1):

$$YV = -S(n)/4 + S(n-1)/2 - S(n-2)/4 \qquad (1)$$

where S(n) is the original signal, S(n−1) is the 1H delay signal and S(n−2) is the 2H delay signal.

Accordingly, the vertical aperture correction signal generating circuit 22 becomes a three-order FIR (finite impulse response) filter having a frequency characteristic shown in FIG. 5. As is clear from FIG. 5, assuming that fs is a sampling frequency of the vertical direction, then a frequency component near fs/2 of the frequency components of the vertical direction is emphasized and added by the adding circuit 16 and subtracted in opposite phase by the subtracting circuit 19. As a consequence, the frequency component having a frequency near fs/2 has the largest amplitude and this amplitude becomes small as the frequency thereof is away from the frequency fs/2.

On the other hand, the adding circuit 18 adds the output signal from the coefficient circuit 17 and the 1H delay signal from the 1H delay circuit 14 to generate an averaging signal in the vertical direction. Therefore, the output signal from the adding circuit 18 becomes a signal blurred in the vertical direction.

Since the horizontal aperture correction signal generating circuit 9 has a high-pass filter (HPF) action to emphasize a high band frequency component of the output from the adding circuit 18, the horizontal aperture correction signal generating circuit 9 generates a horizontal aperture correction signal YH in which a contour portion in the horizontal direction is emphasized.

The low band luminance signal generating circuit 10 has a low-pass filter (LPF) action to reduce a high band frequency component of the output from the adding circuit 18. Consequently, the low band luminance signal generating circuit 10 generates a base luminance signal YL which is blurred both in the vertical and horizontal directions.

The adding circuit 23 corrects the base luminance signal YL by using the horizontal aperture correction signal YH and the vertical aperture correction signal YV to output a desired luminance signal Y.

In the imaging device of the pixel mixing system used in the conventional color video cameras, as shown in FIG. 1, pixel signals of the upper and lower two lines are added within the imaging device and then output. In this case, three primary color components R (red), G (green), B (blue) of a light contained in lights obtained from the respective pixels are expressed as:

$$\begin{rcases} \text{Magenta} \quad Mg = R + B \\ \text{Yellow} \quad Ye = R + B \\ \text{Cyan} \quad Cy = G + B \end{rcases} \quad (2)$$

Therefore, assuming that $Y(n-1)$ represents a luminance signal spectral characteristic of the 1H delay signal, then the luminance signal spectral characteristic in the horizontal scanning is expressed by a sum of adjacent pixels. Thus, the luminance signal spectral characteristic $Y(n-1)$ is expressed as:

$$Y(n-1) = Wr + Gb = 2R + 3G + 2B \quad (3)$$

Further, assuming that $Y(n)$ represents a luminance signal spectral characteristic of the original signal and the 2H delay signal, then the luminance signal spectral characteristic $Y(n)$ is expressed as;

$$Y(n) = Gr + Wb = 2R + 3G + 2B \quad (4)$$

Therefore, the luminance signal spectral characteristics of the respective lines become equal to each other.

In order to record a still picture by using the imaging device of the pixel mixing system, there are generally used a frame still picture recording system in which output signals of respective fields in which pixels are mixed are interleaved to record an image of one frame and a field still picture recording system in which only an image of one field is recorded. The field still picture recording system suffers from the following disadvantages;

(1) A matrix correction cannot be effected and a color moire in the vertical direction is increased as is described in Japanese laid-open patent publication No. (JP-A-)1-143482; and (2) A resolution in the vertical direction becomes insufficient and a still picture of a satisfactory image quality cannot be obtained. For this reason, it is desired that a still picture is recorded according to the frame still picture recording system. However, when a still picture is recorded according to the frame still picture recording system, if the cameraman takes a picture of an object whose motion is large, there is then the problem that an image is blurred to cause an image to become a double-image.

To solve the aforesaid problems, unlike the aforementioned prior art in which the pixels are mixed as A1, A2, A1, A2, ..., within the imaging device at every line in each horizontal scanning in the first field as earlier noted with reference to FIG. 2, there is considered a still picture recording system in which pixel signals are read out as A1, A2, A3, ... in the first field and pixel signals are read out as B1, B2, B3, ... in the next field to thereby record a still picture as shown in FIG. 6. In this case, the signal of each pixel on the imaging device holds an image at a certain timing point, and an incident light is shielded until the read-out of pixels of two fields is ended, whereafter the incident light is permitted to enter the imaging device one more time and then an object is picked up. Therefore, according to this still picture recording system, a blur of an image due to the motion of an object can be avoided, whereby a still picture can be recorded with less deterioration of a resolution. This still picture recording system will hereinafter be referred to as a full frame still picture recording system.

It was understood that the technique that pixels from the imaging device of the pixel mixing system are not mixed and read out can be realized even by a commercially available imaging device under the control of a driving pulse supplied to the imaging device. However, to realize the full frame still picture recording system, a video signal must be sequentially read out by 1H each in the order of color filters arrayed on the imaging device at the unit of pixels. Image data forming one frame picture is output from the imaging device at every field in every other line and cannot be processed in a predetermined signal processing fashion under this condition. After the examination, it is concluded that, if a frame memory that can store image data of two fields (one frame) output from the imaging device is employed and the output signal from the imaging device is read out from the frame memory in a non-interlace fashion after the output signal of one frame from the imaging device had been stored in the frame memory, then a still picture can be recorded according to the full frame still picture recording system. Study of examined results of image simulation reveals that, even when a still picture is recorded by using the imaging device of the pixel mixing system according to the full frame still picture recording system, an image with a sufficient image quality can be obtained as a still picture. However, since the luminance signal spectral characteristics of respective horizontal lines output from the imaging device are not coincident, the conventional vertical aperture correction processing (vertical enhancing processing) is not effective and as result, a line pair component occurs in the picture. This problem will be described below.

According to the aforesaid full frame still picture recording method, the imaging device in which color filters are arrayed as shown in FIG. 6 alternately outputs Mg and G in the horizontal scanning of a certain field. In the horizontal scanning of the next field, the imaging device alternately outputs Ye and Cy, which are then stored in a frame memory. The frame memory alternately outputs Mg and G in the horizontal scanning of a certain field and also alternately outputs G and Mg in the horizontal scanning of the next field. In this case, the output signal is presented as shown in FIG. 6 where $S(n)$ represents the original signal, $S(n-1)$ represents the 1H delay signal and S(n−2) represents the 2H delay signal.

If the pixel signals adjacent in the horizontal direction are added and then output in FIG. 6, then a luminance signal spectral characteristic Y(n−1)' of the 1H delay signal S(n−1) is expressed as:

$$Y(n-1)' = Ye + Cy = R + 2G + B \tag{5}$$

Then, a luminance signal spectral characteristic Y(n)' of the original signal S(n) and the 2H delay signal S(n−2) is expressed as:

$$Y(n)' = G + Mg = R + G + B \tag{6}$$

Accordingly, the luminance signal spectral characteristics become different values at every horizontal scanning. As a result, the luminance signal has a frequency component of fs/2 (fs is the sampling frequency in the vertical direction) in the vertical direction. Also, since the conventional vertical aperture correcting circuit shown in FIG. 4 has the frequency characteristic shown in FIG. 5, the frequency component fs/2 is superimposed upon the vertical aperture correction signal as it is. Consequently, the line pair component occurs in the picture, which unavoidably leads to the deterioration of the image quality of the still picture.

SUMMARY OF THE INVENTION

An object of the present invention is to provide an apparatus for correcting a vertical aperture of an image in which a line pair component that takes place when an aperture of an image is corrected in a full frame still picture recording system can be suppressed.

To achieve the aforesaid object, an apparatus for correcting a vertical aperture of an image according to the present invention is comprised of a 1H delay means for delaying an input signal by 1H to generate a 1H delay signal, a 1H delay means for further delaying the 1H delay signal by 1H to generate a 2H delay signal, a 1H delay means for further delaying the 2H delay signal by 1H to generate a 3H delay signal, a 1H delay means for further delaying the 3H delay signal by 1H to generate a 4H delay signal, an average means for averaging the input signal and the 2H delay signal, a subtracting means for subtracting an output of the averaging means from the 1H delay signal, a low-pass filter (LPF) for eliminating a repetitive period component of a pixel in the horizontal direction from an output of the subtracting means, a base clipping means for eliminating a noise component of low level from an output of the low-pass filter and a coefficient circuit for adjusting a gain of an output from the base clipping means.

As another mode that can achieve the aforesaid object, an apparatus for correcting a vertical aperture of an image according to the present invention is comprised of a coefficient multiplying means for multiplying a part of a signal output from an imaging device, the signal having different luminance signal spectral characteristics at every horizontal scanning, with a coefficient such that luminance signal spectral characteristics in respective horizontal scannings are approximated, and a base clipping means for eliminating a remaining line pair component of low level.

The original signal, the 2H delay signal and the 4H delay signal read out from the frame memory are equal in luminance signal spectral characteristic so that, when a vertical aperture correction signal is generated from these signals, it becomes possible to correct the vertical aperture of the image without causing a line pair component.

Furthermore, with the coefficient multiplying means which multiplies the signal with the coefficient to approximate the luminance signal spectral characteristics in the respective horizontal scannings, when the signal outputs are obtained as shown in FIG. 7, for example, the luminance signal spectral characteristics of respective lines can be approximated by making the gain of only the G signal twice.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 2 is a diagram used to explain a filter array of a conventional CCD imaging device of a pixel mixing system;

FIG. 3 is a diagram showing signal components of an original signal, a 1H delay signal and a 2H delay signal read out from the CCD imaging device of the pixel mixing system, and to which references will be made in explaining the conventional CCD imaging device of the pixel mixing system shown in FIG. 1;

DESCRIPTION OF THE PREFERRED EMBODIMENTS

The present invention will now be described with reference to the drawings. An apparatus for correcting a vertical aperture of an image according to a first embodiment of the present invention will be described with reference to FIG. 1.

Figure 1:
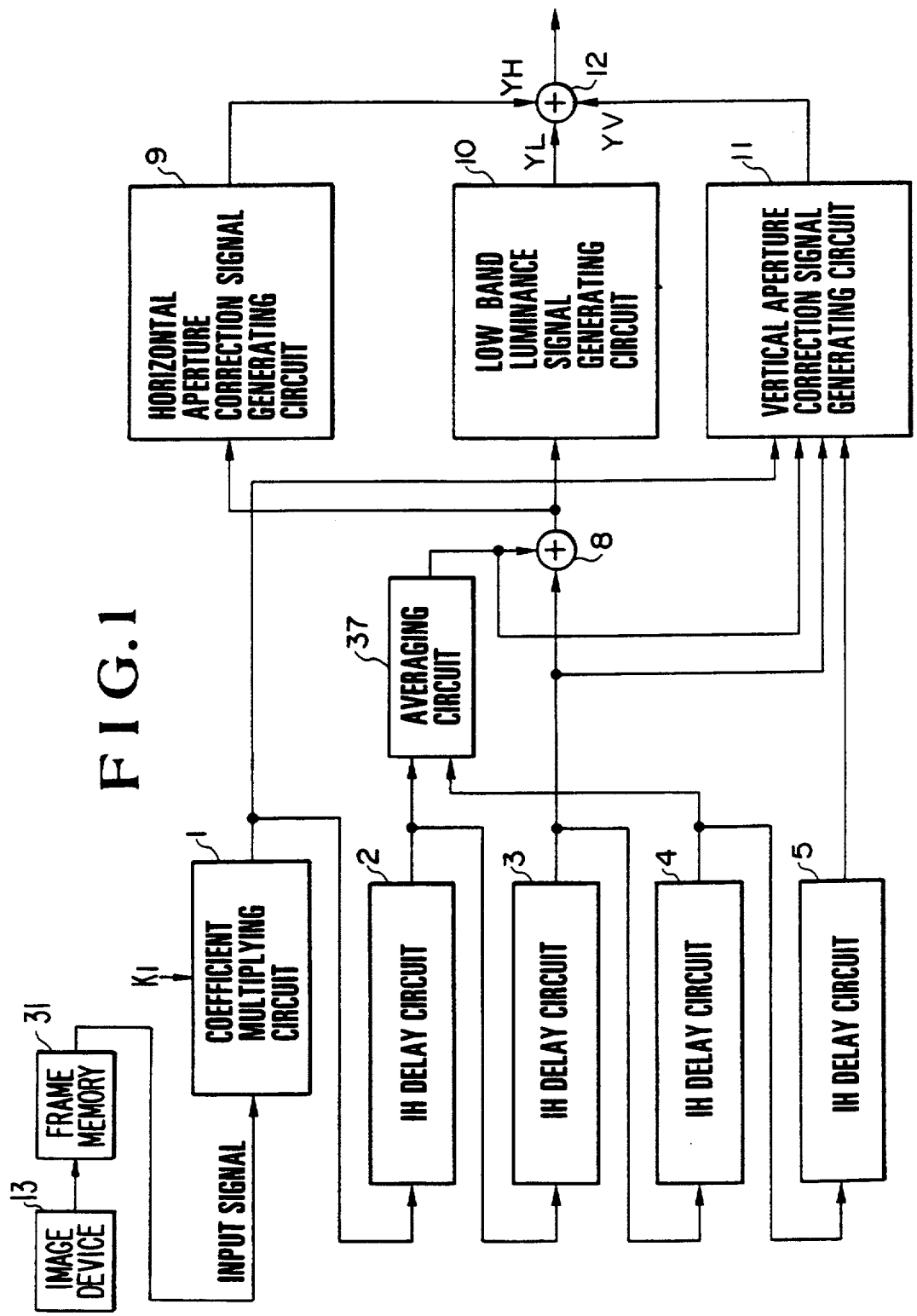
FIG. 1 is a block diagram showing an apparatus for correcting a vertical aperture of an image according to a first embodiment of the present invention.
Figure 4:
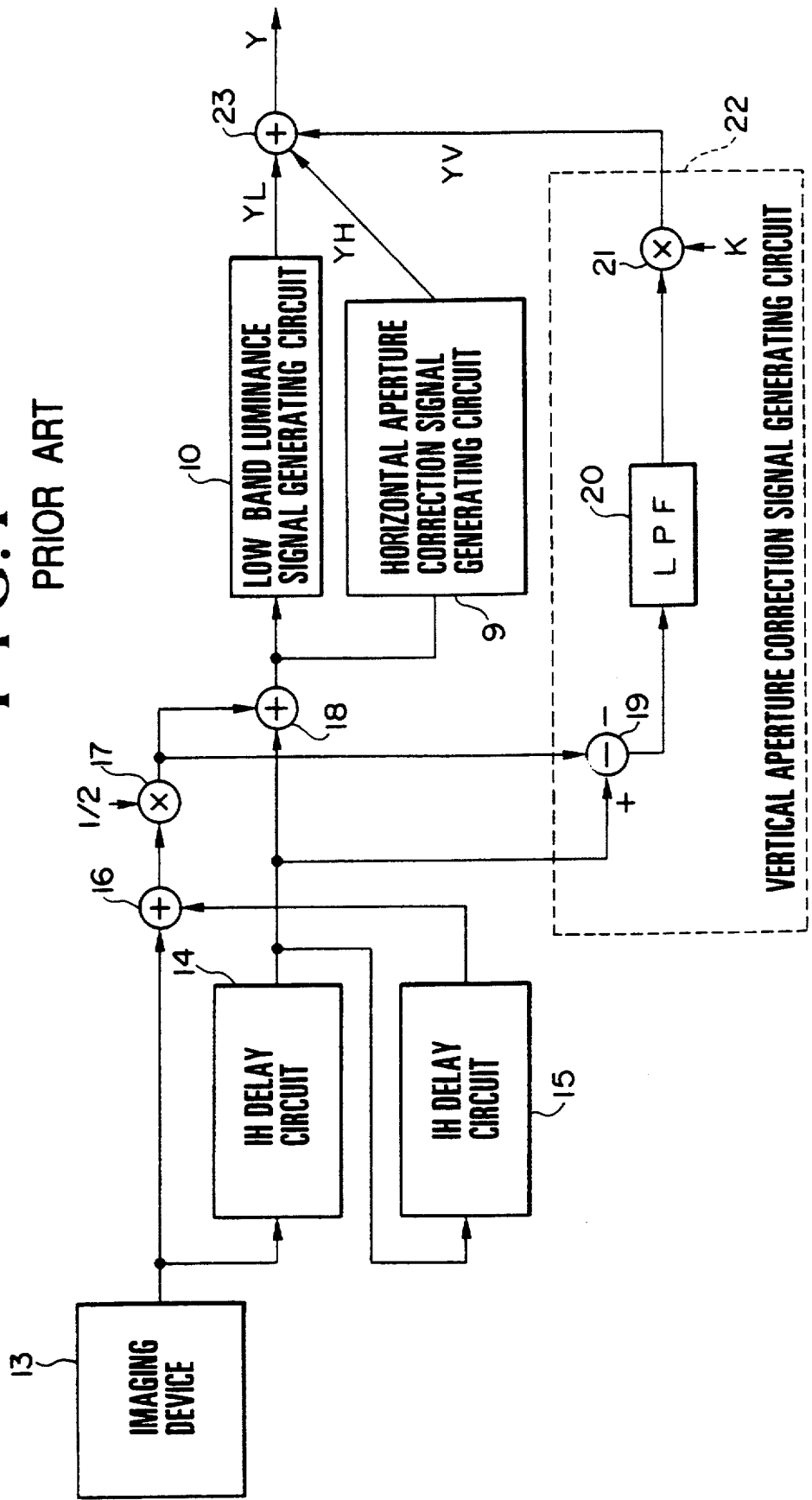
FIG. 4 is a block diagram showing an example of a conventional vertical aperture correcting circuit utilized in a color video camera.

FIG. 1 is a block diagram showing a circuit arrangement of a luminance signal generating circuit according to the embodiment of the present invention. In FIG. 1, reference numeral 1 depicts a coefficient multiplying circuit, 2, 3, 4 and 5 depict 1H delay circuits, 8 and 12 depict adding circuits, 37 depicts an averaging circuit, 9 depicts a horizontal aperture correction signal generating circuit, 10 depicts a low band luminance signal generating circuit and 11 depicts a vertical aperture correction signal generating circuit, respectively.

The coefficient multiplying circuit 1 is additionally provided in order to suppress the aforesaid line pair component. Action of the coefficient multiplying circuit 1 will be described below.

As earlier described with the contrast of the equations (5) and (6), according to the full frame still picture recording system, the luminance signal spectral characteristics alternately appear at every horizontal scanning as $(R+2G+B)$ and $(R+G+B)$, which causes the line pair component to occur to deteriorate the image quality of the still picture.

Figure 6:
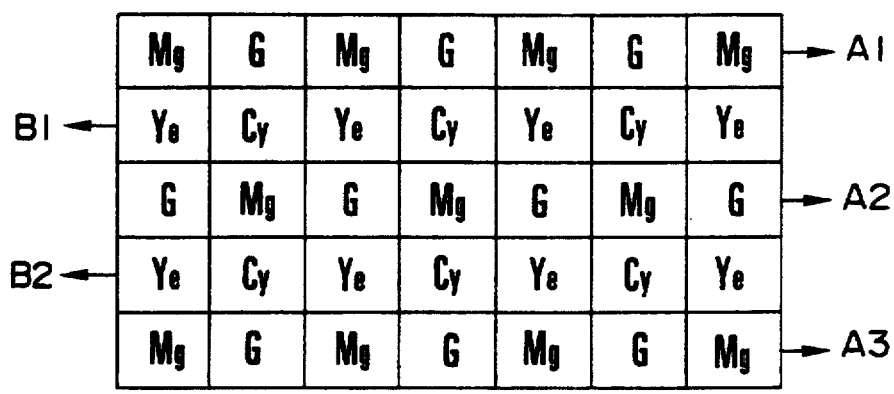
FIG. 6 is a diagram showing a filter array, and to which references will be made in explaining a full frame still picture recording system according to the present invention.
Figure 7:
FIG. 7 is a diagram showing signal components of an original signal, a 1H delay signal and a 2H delay signal read out from the imaging device at every frame according to the full frame still picture recording system shown in FIG. 5.
Figure 7:
Figure 7:
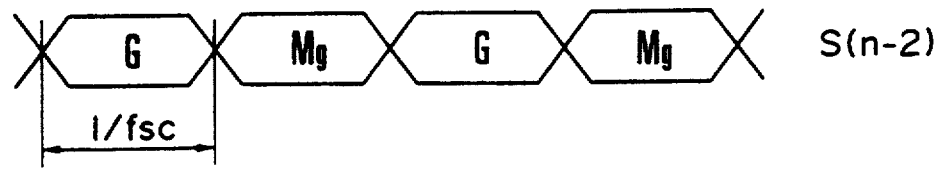

As earlier described with reference to FIG. 6, the luminance signal spectral characteristic $Y(n-1)'$ of the 1H delay signal is expressed as:

$$Y(n-1)' = Ye + Cy = R + 2G + B \quad (5)$$

The luminance signal spectral characteristic $Y(n)'$ of the original signal and the 2H delay signal is expressed as:

$$Y(n)' = G + Mg = R + G + B \quad (6)$$

Therefore, if the gain of only the G signal in the original signal and the 2H delay signal is made twice, then a luminance signal spectral characteristic $Y(n)''$ at that time is expressed as:

$$Y(n)'' = 2 \times G + Mg = R + 2G + B \quad (7)$$

Accordingly, in respective horizontal scannings, the luminance signal spectral characteristics become equal to each other. Thus, by selecting the coefficient of the coefficient multiplying circuit 1 such that a difference between the luminance signal spectral characteristics of adjacent horizontal scanning periods is minimized, it is possible to minimize a line pair component (i.e., fs/2 frequency component where fs is the sampling frequency of the vertical direction of an image) contained in the vertical aperture correction signal generated by the adjacent three lines of the original signal, the 1H delay signal and the 2H delay signal.

Figure 8:
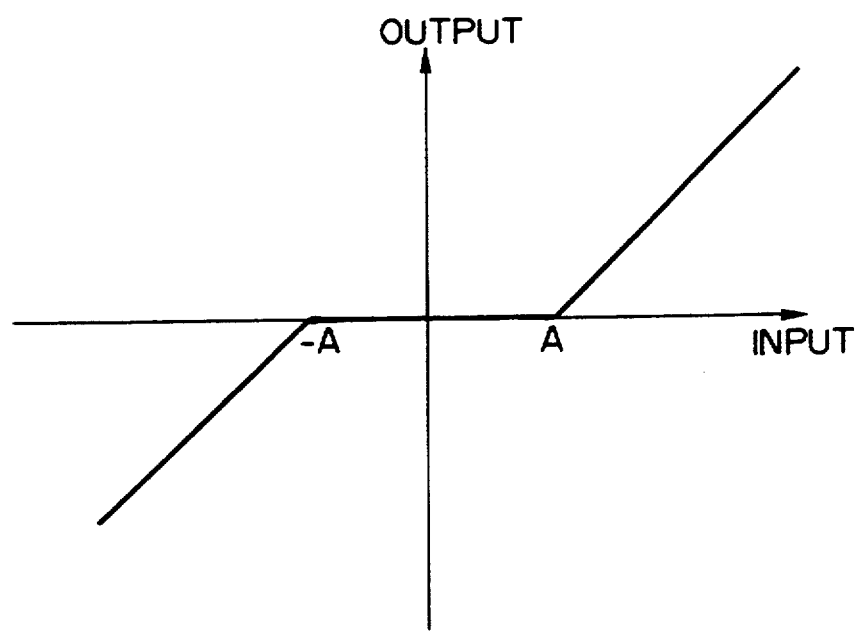
FIG. 8 is a diagram used to explain input and output characteristics of a base clipping circuit used in the first embodiment of the present invention.

Signals sequentially read out from the frame memory (not shown) are input to the coefficient multiplying circuit 1, in which the gain of only the G signal provided during the scanning in which a repetitive pixel signal of the G signal and the Mg signal can be obtained is made twice. Since the position of the pixel existing in the G signal stored in the frame memory is known in advance, only the G signal can be made twice in gain by supplying an instruction signal for making the input signal twice in gain to the coefficient multiplying circuit 1 in unison with a read-out timing of the G signal. In this way, the occurrence of the aforesaid line pair component can be reduced. However, due to the characteristics of the imaging device, it is impossible to make the luminance signal spectral characteristics coincident with each other perfectly during each horizontal scanning period. Consequently, the line pair component cannot be eliminated completely. Therefore, a remaining line pair component must be eliminated by the base clipping circuit. The base clipping circuit has input and output characteristics shown in FIG. 8 to eliminate a small amplitude component in which an amplitude of a signal is less than $\pm A$.

The base clipping circuit is provided within the vertical aperture correction signal generating circuit 11 as will be described later on. Although the line pair component can be eliminated by the base clipping circuit, a vertical signal component of a small amplitude also is eliminated. Therefore, it is desired that the magnitude of the amplitude $\pm A$ to be clipped can be adjusted properly.

As shown in FIG. 1, the signal read out from the frame memory (not shown) is supplied to the coefficient multiplying circuit 1, in which it is approximated in luminance signal spectral characteristic of each line and then supplied to the 1H delay circuit 2. The output from the 1H delay circuit 2 is supplied to the 1H delay circuit 3, and the output from the 1H delay circuit 3 is supplied to the 1H delay circuit 4. Further, the output from the 1H delay circuit 4 is supplied to the 1H delay circuit 5. Thus, a 1H delay signal, a 2H delay signal, a 3H delay signal and a 4H delay signal are generated by the 1H delay circuits 2, 3, 4 and 5, respectively. The output (1H delay signal) from the 1H delay circuit 2 and the output (3H delay signal) from the 1H delay circuit 4 are averaged by the averaging circuit 37 and then fed to the adding circuit 8. The adding circuit 8 adds the output (2H delay signal) from the 1H delay circuit 3 and the output from the averaging circuit 37. Then, the added output from the adding circuit 8 is supplied to the horizontal aperture correction signal generating circuit 9 and the low band luminance signal generating circuit 10. The horizontal aperture correction signal generating circuit 9 generates the horizontal aperture correction signal YH from the output of the adding circuit 8. The low band luminance signal generating circuit 10 generates from the output of the adding circuit 8 the low band luminance signal component YL which is the base signal whose aperture is not corrected. The original signal output from the coefficient multiplying circuit 1, the output (2H delay signal) from the 1H delay circuit 3, the output (4H delay signal) from the 1H delay circuit 5 and the output of the averaging circuit 37 are substantially equal in luminance signal spectral characteristics of the vertical direction and are all supplied to the vertical aperture correction signal generating circuit 11 which derives the vertical aperture correction signal YV. The vertical aperture correction signal YV thus generated is supplied to the adding circuit 12, in which it is added with the horizontal aperture correction signal YH and the low band luminance signal component YL to provide a luminance signal Y which is corrected in aperture both in the horizontal and vertical directions.

Figure 9:
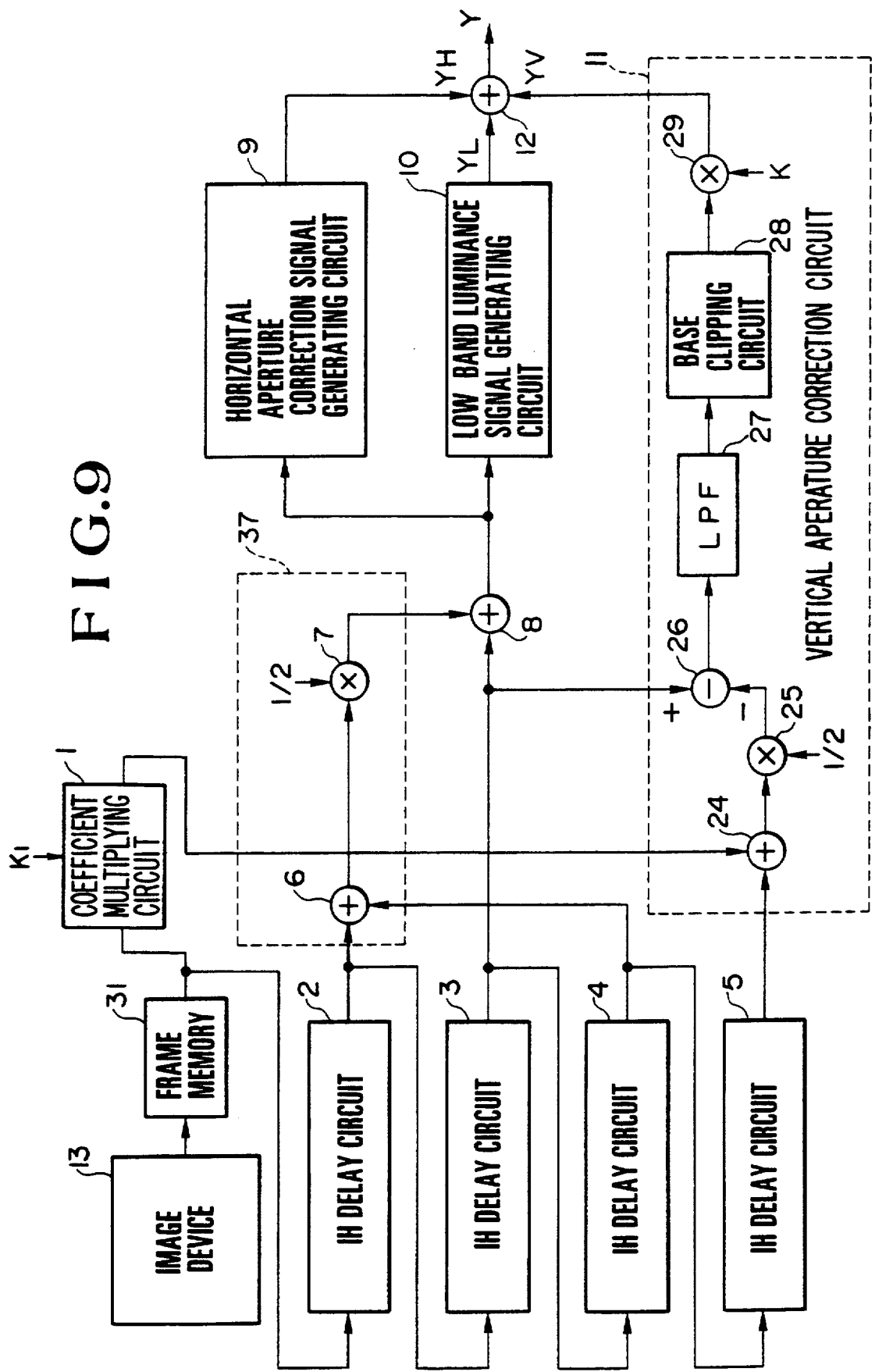
FIG. 9 is a block diagram showing a circuit arrangement of a luminance signal generating circuit according to a second embodiment of the present invention.

FIG. 9 is a block diagram showing a circuit arrangement of a luminance signal generating circuit according to a second embodiment of the present invention. In FIG. 9, reference numeral 13 designates an imaging device, 31 depicts a frame memory, 2, 3, 4, and 5 depict 1H delay circuits, 6, 8, 12 and 24 depict adding circuits, 7, 25 and 29 depict coefficient circuits, 26 depicts a subtracting circuit, 9 depict a horizontal aperture correction signal generating circuit, 10 depict a low band luminance signal generating circuit, 27 depict an LPF (low-pass filter), 28 depict a base clipping circuit, and 11 depicts a vertical aperture correction signal generating circuit, respectively.

As shown in FIG. 9, a signal output from the imaging device 13 is supplied to the frame memory 31, in which it is stored in one frame amount and then read out in a non-interlace fashion. The signal read out from the frame memory 31 is supplied to the adding circuit 24 and the 1H delay circuit 2. The output from the 1H delay circuit 2 is supplied to the 1H delay circuit 3, and the output from the 1H delay circuit 3 is supplied to the 1H delay circuit 4. Also, the output from the 1H delay circuit 4 is supplied to the 1H delay circuit 5. Thus, a 1H delay signal, a 2H delay signal, a 3H delay signal and a 4H delay signal are generated by the 1H delay circuits 2, 3, 4 and 5, respectively. The output (1H delay signal) from the 1H delay circuit 2 and the output (3H delay signal) from the 1H delay circuit 4 are added by the adding circuit 6. The added output from the adding circuit 6 is multiplied with a coefficient of ½ by the coefficient circuit 7, and then supplied to the adding circuit 8. The output (2H delay signal) from the 1H delay circuit 3 and the output from the coefficient circuit 7 are added by the adding circuit 8 and then supplied to the horizontal aperture correction signal generating circuit 9 and the low band luminance signal generating circuit 10. The horizontal aperture correction signal generating circuit 9 generates the horizontal aperture correction signal YH from the output of the adding circuit 8. The low band luminance signal generating circuit 9 generates from the output of the adding circuit 8 the low band luminance signal component YL which is not yet corrected in aperture. The original signal output from the frame memory 31 and the output (4H delay signal) from the 1H delay circuit 5 are added by the adding circuit 24, multiplied with a coefficient of ½ by the coefficient circuit 25 and then supplied to the subtracting circuit 26. The subtracting circuit 26 subtracts the output of the coefficient circuit 25 from the output (2H delay signal) of the 1H delay circuit 3 to generate the vertical aperture correction signal YV. The vertical aperture correction signal YV thus generated is eliminated in repetitive period component of each pixel in each horizontal scanning by the low-pass filter (LPF) 27, reduced in noise by the base clipping circuit 28, adjusted in gain by the coefficient circuit 29 and then added with the horizontal aperture correction signal YH and the low band luminance signal component YL by the adding circuit 12 to thereby generate the luminance signal Y which is corrected in aperture both in the horizontal and vertical directions.

Figure 10:
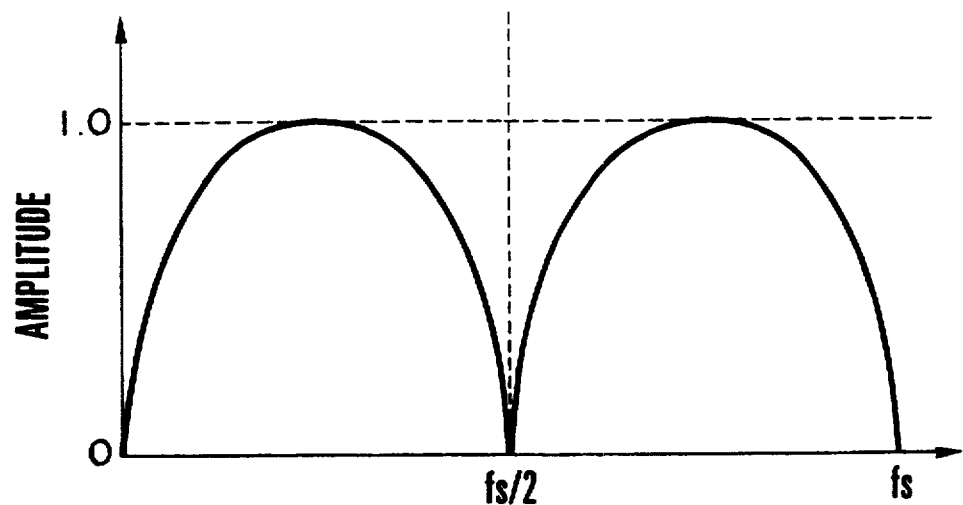
FIG. 10 is a diagram showing a frequency characteristic of a vertical aperture correction signal generated from the original signal, the 2H delay signal and the 4H delay signal.

The vertical aperture correction signal YV according to this embodiment is expressed by the following equation (8):

$$YV = -S(n)/4 + S(n-2)/2 - S(n-4)/4 \qquad (8)$$

where S(n) represents the original signal, S(n−2) represents the 2H delay signal and S(n−4) represents the 4H delay signal, respectively. This becomes a three-dimensional FIR (finite impulse response) filter whose frequency characteristic is illustrated in FIG. 10. Study of FIG. 10 reveals that the vertical aperture correction signal generated by the vertical aperture correcting apparatus of the present invention mainly contains a frequency component near fs/4 (fs is the sampling frequency in the vertical direction) as a frequency component of the vertical direction and that a frequency component near fs/2 which becomes a noise component is eliminated from the vertical aperture correction signal of the present invention.

Figure 11:
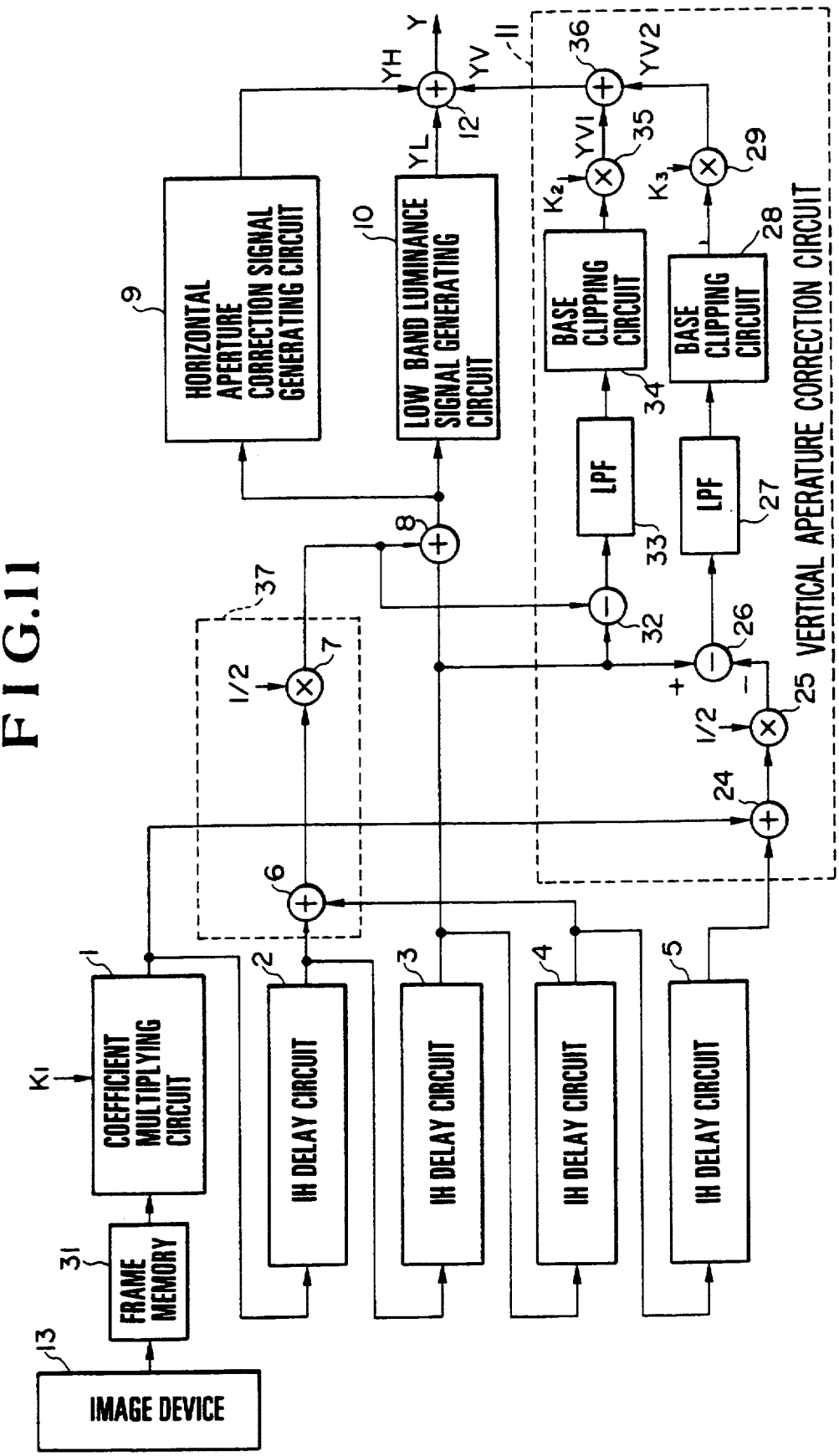
FIG. 11 is a block diagram showing a circuit arrangement of an apparatus for correcting a vertical aperture of an image according to a third embodiment of the present invention.

FIG. 11 is a block diagram showing a circuit arrangement of the luminance signal generating circuit according to a third embodiment of the present invention. In FIG. 11, reference numeral 13 depicts an imaging device, 31 a frame memory, 2, 3, 4 and 5 1H delay circuits, 6, 8, 12, 24 and 36 adding circuits, 7, 25, 29 and 35 coefficient circuits, 26 and 32 subtracting circuits, 9 a horizontal aperture correction signal generating circuit, 10 a low band luminance signal generating circuit, 27 and 33 LPFs (low-pass filters), 28 and 34 base clipping circuits, and 11 a vertical aperture correction signal generating circuit, respectively.

As shown in FIG. 11, a signal output from the imaging device 13 is supplied to the frame memory 31, in which it is stored in one frame amount and then read out in a non-interlace fashion. The signal read out from the frame memory 31 is supplied to the coefficient multiplying circuit 1, in which a gain of the G signal in the read-out signal is adjusted at every other 1H. Consequently, luminance signal spectral characteristics thereof are approximated in each horizontal scanning. The output thus processed by the coefficient multiplying circuit 1 is supplied to the adding circuit 24 and the 1H delay circuit 2. The output of the 1H delay circuit 2 is supplied to the 1H delay circuit 3, the output of the 1H delay circuit 3 is supplied to the 1H delay circuit 4, and the output of the 1H delay circuit 4 is supplied to the 1H delay circuit 5. Thus, a 1H delay signal, a 2H delay signal, a 3H delay signal and a 4H delay signal are generated by the 1H delay circuits 2, 3, 4 and 5, respectively.

The original signal read out from the frame memory 31 and the output (4H delay signal) from the 1H delay circuit 5 are added by the adding circuit 24, multiplied with a coefficient of ½ by the coefficient circuit 25, and then supplied to the subtracting circuit 26. The subtracting circuit 26 subtracts the output of the coefficient circuit 25 from the output (2H delay signal) of the 1H delay circuit 3. The subtracted output from the subtracting circuit 26 is supplied to the low-pass filter 27, in which it is reduced in repetitive period component of each pixel in each horizontal scanning. The output thus processed by the low-pass filter 27 is reduced in noise by the base clipping circuit 28 and then adjusted in gain by the coefficient circuit 29 which derives a middle band vertical aperture correction signal YV2 having a frequency characteristic shown in FIG. 10. Incidentally, since the output from the low-pass filter 27 has the frequency characteristic shown in FIG. 10, and a line pair component is eliminated therefrom. Hence, the base clipping circuit 28 may be removed from the circuit arrangement shown in FIG. 11.

The output (1H delay signal) from the 1H delay circuit 2 and the output (3H delay signal) from the 1H delay circuit 4 are added by the adding circuit 6. The added output from the adding circuit 6 is multiplied with a coefficient of ½ by the coefficient circuit 7 and then fed to the adding circuit 8.

The output (2H delay signal) from the 1H delay circuit 3 and the output from the coefficient circuit 7 are added by the adding circuit 8 and then supplied to the horizontal aperture correction signal generating circuit 9 and the low band luminance signal generating circuit 10. The horizontal aperture correction signal generating circuit 9 generates the horizontal aperture correction signal YH from the output of the adding circuit 8. Also, the low band luminance signal generating circuit 10 generates from the output of the adding circuit 8 the low band luminance signal component YL which is not yet corrected in aperture.

Figure 5:
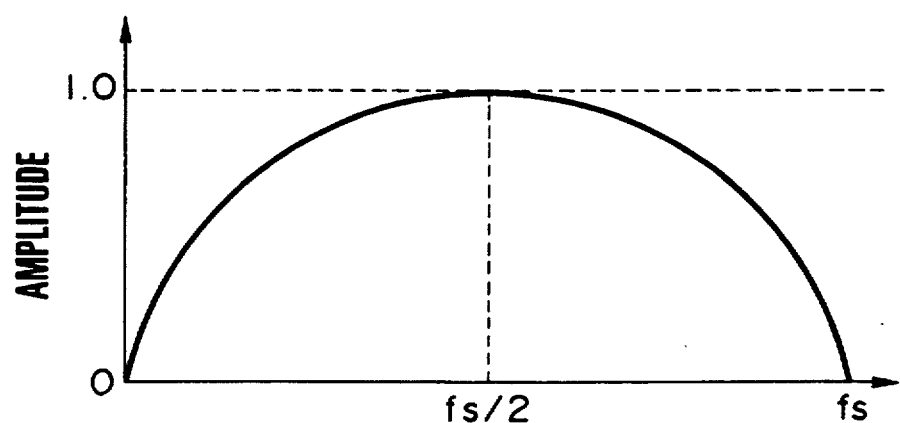
FIG. 5 is a diagram showing a frequency characteristic of a vertical aperture correction signal generated from the original signal, the 1H delay signal and the 2H delay signal.

The subtracting circuit 32 subtracts the output of the coefficient circuit 7 from the output (2H delay signal) of the 1H delay circuit 3. The subtracted output from the subtracting circuit 32 is supplied to the low-pass filter 33, in which it is eliminated in repetitive period component of each pixel in every horizontal scanning. The output thus processed by the low-pass filter 33 is reduced in noise by the base clipping circuit 34 and then adjusted in gain by the coefficient circuit 35 to thereby generate a high band vertical aperture correction signal YV1 having a frequency characteristic shown in FIG. 5. Since the output from the low-pass filter 33 has the frequency characteristic shown in FIG. 5, a line pair component can be considerably eliminated by the action of the coefficient multiplying circuit 1, and a remaining line pair component can be sufficiently eliminated by the base clipping circuit 34.

The adding circuit 12 adds the vertical aperture correction signal YV, the horizontal aperture correction signal YH and the low band luminance signal component YL to generate the luminance signal Y which is corrected in aperture both in the horizontal and vertical directions.

While the vertical aperture correction signal YV contains only the middle band frequency component (frequency component near fs/4) in the second embodiment shown in FIG. 9, the vertical aperture correction signal YV contains the high band frequency component (frequency component near fs/2) in addition to the middle band frequency component in the third embodiment shown in FIG, 11. According to the third embodiment of the present invention, an image with further improved sharpness can be obtained as compared with the second embodiment shown in FIG. 9.

As set out above, according to the present invention, the vertical aperture correction signal which does not contain the line pair component can be generated from the signal read out at every frame from the imaging device of the pixel mixing system.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An apparatus for correcting a vertical aperture of an image comprising:
   a generating means for generating signals whose luminance signal spectral characteristics are different from each other between adjacent horizontal scannings and which are repeated at every other horizontal scanning;
   a coefficient multiplying means for correcting luminance signal spectral characteristics of said signals from said generating means at every other horizontal scanning to thereby approximate luminance signal spectral characteristics between adjacent horizontal scannings;
   a horizontal scanning period delay circuit supplied with an output from said coefficient multiplying means and for delaying said output by integral multiples of one horizontal scanning period to output a plurality of horizontal scanning period delay signals which have delay periods different from each other;
   a vertical aperture correction signal generating circuit including an averaging means for averaging said output from said coefficient multiplying means and an output delayed by a largest delay period from said horizontal scanning period delay circuit to produce an output, and a means for subtracting said output of said averaging means from a horizontal scanning period delay signal delayed by an intermediate delay period of said horizontal scanning period delay signals from said horizontal scanning period delay circuit to generate a vertical aperture correction signal.

2. An apparatus for correcting a vertical aperture of an image comprising:
   a generating means for generating signals whose luminance signal spectral characteristics are different from each other between adjacent horizontal scannings and which are repeated at every other horizontal scanning;
   a coefficient multiplying means for correcting luminance signal spectral characteristics of said signals from said generating means at every other horizontal scanning to thereby approximate luminance signal spectral characteristics between adjacent horizontal scannings;
   a horizontal scanning period delay circuit supplied with an output from said coefficient multiplying means and for delaying said output by integral multiples of one horizontal scanning period to output a plurality of horizontal scanning period delay signals which have delay periods different from each other;
   a vertical aperture correction signal generating circuit including an averaging means for averaging said output from said coefficient multiplying means and an output delayed by a largest delay period from said horizontal scanning period delay circuit, and a means for subtracting an output of said averaging means from a horizontal scanning period delay signal delayed by an intermediate delay period of said horizontal scanning period delay signals from said horizontal scanning period delay circuit to generate a vertical aperture correction signal;
   wherein said vertical aperture correction signal generating means further includes a base clipping circuit for eliminating a noise component of a predetermined low level from said vertical aperture correction signal supplied thereto.

3. An apparatus for correcting a vertical aperture of an image comprising:
   an input signal generating means for generating input signals whose luminance signal spectral characteristics are different from each other between adjacent horizontal scannings and which are repeated at every other horizontal scanning;
   a correcting means for correcting said luminance signal spectral characteristics of said input signals from said generating means at every other horizontal scanning to thereby approximate luminance signal spectral characteristics between adjacent horizontal scannings;
   a horizontal scanning period delay circuit for delaying an output from said correcting means and for providing a one-horizontal scanning period delay signal, a two-horizontal scanning period delay signal, a three-horizontal scanning period delay signal and a four-horizontal scanning period delay signal;

an averaging means for averaging said one-horizontal scanning period delay signal and said three-horizontal scanning period delay signal; and a vertical aperture correction signal generating means for generating a vertical aperture correction signal on a basis of at least the output from said correcting means, said two-horizontal scanning period delay signal and said four-horizontal scanning period delay signal.

4. An apparatus according to claim 3, wherein said input signal generating means being an imaging device, said imaging device comprising: first horizontal line groups disposed at every other horizontal line to have a number of photoelectric converting elements having color filters corresponding to first and second colors, and second horizontal line groups interleaved between said first horizontal line groups to have a number of photoelectric converting elements having color filters corresponding to third and fourth colors.

5. An apparatus according to claim 3, wherein said input signal generating means comprises: an imaging device in which color filters are arrayed at a unit of pixels, and a frame memory in which a signal of one frame read out by horizontally scanning said imaging device is stored in one frame, and from which said stored signal is read out in a line sequential fashion.

6. An apparatus according to claim 5, wherein said imaging device comprises: first horizontal line groups disposed at every other horizontal line to have a number of photoelectric converting elements having color filters corresponding to first and second colors, and second horizontal line groups interleaved between said first horizontal line groups to have a number of photoelectric converting elements having color filters corresponding to third and fourth colors.

7. An apparatus according to claim 3, wherein said correcting means is a coefficient multiplying circuit for multiplying a part of signals input thereto at every other horizontal scanning with a coefficient.

8. An apparatus according to claim 3, wherein said vertical aperture correction signal generating means further comprises: a base clipping circuit for eliminating a noise component of a predetermined low level from said vertical aperture correction signal supplied thereto.

9. An apparatus according to claim 3, wherein said vertical aperture correction signal generating means further comprises: a low-pass filter for eliminating a signal component of a horizontal direction from said vertical aperture correction signal supplied thereto.

10. The apparatus according to claim 9, wherein said vertical aperture correction signal generating means further comprises a base clipping circuit for eliminating a noise component of a predetermined low level from an output of said low-pass filter.

11. An apparatus for correcting a vertical aperture of an image comprising:

an input signal generating means for generating signals whose luminance signal spectral characteristics are different from each other between adjacent horizontal scannings and which are repeated at every other horizontal scanning;

a horizontal scanning period delay circuit for delaying an output from said input signal generating means and for providing a one-horizontal scanning period delay signal, a two-horizontal scanning period delay signal, a three-horizontal scanning period delay signal and a four-horizontal scanning period delay signal; and a vertical aperture correction signal generating means for generating a vertical aperture correction signal on a basis of at least said two-horizontal scanning period delay signal and said four-horizontal scanning period delay signal.

12. An apparatus according to claim 11, wherein said vertical aperture correction signal generating means comprises an averaging means for averaging said output signal of said input signal generating means and said four-horizontal scanning period delay signal, and subtracting means for subtracting a signal of said averaging means from said two-horizontal scanning period delay signal to generate said vertical aperture correction signal.

13. An apparatus according to claim 11, wherein said vertical aperture correction signal generating means further comprises: a base clipping circuit for eliminating a noise component of a predetermined low level from said vertical aperture correction signal supplied thereto.

14. An apparatus according to claim 11, wherein said vertical aperture correction signal generating means further comprises a low-pass filter for eliminating a signal component of a horizontal direction from said vertical aperture correction signal supplied thereto.

15. An apparatus according to claim 14, wherein said vertical aperture correction signal generating means further comprises a base clipping circuit for eliminating a noise component of a predetermined low level from an output of said low-pass filter.

16. An apparatus according to claim 15, wherein said vertical aperture correction signal generating means further comprises a coefficient circuit for adjusting a magnitude of an output of said base clipping circuit.

17. An apparatus according to claim 11, wherein said input signal generating means comprises: an imaging device in which color filters are arrayed at a unit of pixels, and a frame memory in which a signal of one frame read out by horizontally scanning said imaging device is stored in one frame, and from which said stored signal is read out in a line sequential fashion.

18. An apparatus according to claim 17, wherein said imaging device comprises: first horizontal line groups disposed at every other horizontal line to have a number of photoelectric converting elements having color filters corresponding to first and second colors, and second horizontal line groups interleaved between said first horizontal line groups to have a number of photoelectric converting elements having color filters corresponding to third and fourth colors.

19. An apparatus according to claim 11, wherein said input signal generating means being an imaging device, said imaging device comprising: first horizontal line groups disposed at every other horizontal line to have a number of photoelectric converting elements having color filters corresponding to first and second colors, and second horizontal line groups interleaved between said first horizontal line groups to have a number of photoelectric converting elements having color filters corresponding to third and fourth colors.

20. An apparatus according to claim 11, wherein said vertical aperture correction signal generating means comprises:

a first averaging means for averaging said output signal of said input signal generating means and said four-horizontal scanning period delay signal;

a first subtracting means for subtracting a signal of said first averaging means from said two-horizontal scanning period delay signal;

second averaging means for averaging said one-horizontal scanning period delay signal, and said three-horizontal scanning period delay signal;

a second subtracting means for subtracting a signal of said second averaging means from said two-horizontal scanning period delay signal; and an adjusting means for adjusting magnitudes of outputs from said first and second subtracting means and adding a resulting adjusted two outputs to thereby generate said vertical aperture correction signal.

21. The apparatus according to claim 20, wherein said vertical aperture correction signal generating means further comprises: a base clipping circuit for eliminating a noise component of a predetermined low level from said output of said second subtracting means.

22. The apparatus according to claim 20, wherein said vertical aperture correction signal generating means further comprises: low-pass filters for eliminating signal components of horizontal direction from outputs supplied thereto from said first and second subtracting means.

23. An apparatus according to claim 20, wherein said input signal generating means comprises: an imaging device in which color filters are arrayed at a unit of pixels, and a frame memory in which a signal of one frame read out by horizontally scanning said imaging device is stored in one frame, and from which said stored signal is read out in a line sequential fashion.

24. An apparatus for correcting a vertical aperture of an image comprising:

an input signal generating means for generating input signals whose luminance signal spectral characteristics are different from each other between adjacent horizontal scannings and which are repeated at every other horizontal scanning;

a correcting means for correcting luminance signal spectral characteristics from said generating means at every other horizontal scanning to thereby approximate luminance signal spectral characteristics between adjacent horizontal scannings;

a horizontal scanning period delay circuit for delaying an output from said correcting means and for providing a two-horizontal scanning period delay signal and a four-horizontal scanning period delay signal; and a vertical correction means for generating a vertical aperture correction signal on a basis of at least the output from said correcting means, said two-horizontal scanning period delay signal and said four-horizontal scanning period delay signal.

25. An apparatus for correcting a vertical aperture of an image comprising:

an input signal generating means for generating signals whose luminance signal spectral characteristics are different from each other between adjacent horizontal scanning and which are repeated at every other horizontal scanning;

a horizontal scanning period delay circuit for delaying an output from said input signal generating means and for providing a two-horizontal scanning period delay signal and a four-horizontal scanning period delay signal; and a correction means for generating a vertical aperture correction signal on a basis of at least the output from said input signal generating means, said two-horizontal scanning period delay signal and said four-horizontal scanning period delay signal.

26. An apparatus according to claim 25, wherein said horizontal scanning period delay circuit additionally provides a one-horizontal scanning period delay signal and a three-horizontal scanning period delay signal, and wherein said correction means comprises:

a first averaging means for averaging the output signal of said input signal generating means and said four-horizontal scanning period delay signal;

a first subtracting means for subtracting a signal of said first averaging means from said two-horizontal scanning period delay signal;

a second averaging means for averaging said one-horizontal scanning period delay signal and said three-horizontal scanning period delay signal;

a second subtracting means for subtracting a signal of said second averaging means from said two-horizontal scanning period delay signal; and an adjusting means for adjusting magnitudes of outputs from said first and second subtracting means and adding a resulting adjusted two outputs to thereby generate said vertical aperture correction signal.

* * * * *

UNITED STATES PATENT AND TRADEMARK OFFICE
CERTIFICATE OF CORRECTION

PATENT NO. : 5,430,499
DATED : July 4, 1995
INVENTOR(S) : Kouji Asada, et. al.

It is certified that error appears in the above-indentified patent and that said Letters Patent is hereby corrected as shown below:

Title page, item [30], Foreign Priority Application should read as follows:

-- 04-274036    Japan    October 13, 1992--.

Signed and Sealed this

Sixteenth Day of January, 1996

Attest:

BRUCE LEHMAN

Attesting Officer    Commissioner of Patents and Trademarks